US010212706B2

(12) United States Patent
Malladi et al.

(10) Patent No.: US 10,212,706 B2
(45) Date of Patent: Feb. 19, 2019

(54) SHARED SPECTRUM ACCESS

(71) Applicant: QUALCOMM Incorporated, San Diego, CA (US)

(72) Inventors: Durga Prasad Malladi, San Diego, CA (US); Dean Robert Brenner, Washington, DC (US); John Walter Kuzin, Washington, DC (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 14/700,423

(22) Filed: Apr. 30, 2015

(65) Prior Publication Data
US 2015/0358968 A1 Dec. 10, 2015

Related U.S. Application Data

(60) Provisional application No. 62/008,209, filed on Jun. 5, 2014.

(51) Int. Cl.
| H04W 72/04 | (2009.01) |
| H04W 56/00 | (2009.01) |
| H04W 24/08 | (2009.01) |
| H04W 16/14 | (2009.01) |
| H04W 74/08 | (2009.01) |

(52) U.S. Cl.
CPC ....... *H04W 72/0453* (2013.01); *H04W 16/14* (2013.01); *H04W 24/08* (2013.01); *H04W 56/001* (2013.01); *H04W 74/0808* (2013.01)

(58) Field of Classification Search
CPC .................................................... H04W 16/14
USPC ........................................................ 455/454
See application file for complete search history.

(56) References Cited

U.S. PATENT DOCUMENTS

| 8,532,041 B1 | 9/2013 | Lambert et al. |
| 2003/0016647 A1 | 1/2003 | Margon |
| 2013/0184025 A1 | 7/2013 | Cho et al. |

(Continued)

FOREIGN PATENT DOCUMENTS

WO  WO-2014054985 A1  4/2014

OTHER PUBLICATIONS

International Search Report and Written Opinion—PCT/US2015/028722—ISA/EPO—dated Jul. 23, 2015.

*Primary Examiner* — Charles N Appiah
*Assistant Examiner* — Frank E Donado
(74) *Attorney, Agent, or Firm* — Liem T. Do

(57) ABSTRACT

Shared spectrum access is disclosed in which multiple tiers of users are allowed to access a set of shared spectrum resources. Second tier users, which receive priority access from the first spectrum tier, transmit reserving signals over the available shared channels during clear channel assessment (CCA) periods associated with the shared channels. Third tier users, which access the shared spectrum at a lower priority than the second tier users, attempt to synchronize timing with second tier users when second tier user presence is detected. Third tier users will be blocked from transmission on the shared channels when the third tier users detect the reserving signals. Second tier users, thus, transmit on the shared channels with a lower likelihood of interference from third tier users, and third tier users will be able to transmit on any of the shared channels when the third tier user detects a clear CCA.

17 Claims, 9 Drawing Sheets

(56) References Cited

U.S. PATENT DOCUMENTS

| | | | | |
|---|---|---|---|---|
| 2013/0203458 A1* | 8/2013 | Charbit | ................ | H04W 52/34 |
| | | | | 455/522 |
| 2014/0079016 A1* | 3/2014 | Dai | ...................... | H04L 5/0041 |
| | | | | 370/330 |
| 2014/0241265 A1* | 8/2014 | Pragada | ................ | H04W 72/06 |
| | | | | 370/329 |
| 2014/0254502 A1* | 9/2014 | Cai | ...................... | H04W 48/20 |
| | | | | 370/329 |
| 2015/0188592 A1* | 7/2015 | Solondz | .............. | H04B 1/3888 |
| | | | | 455/501 |
| 2015/0373554 A1* | 12/2015 | Freda | .................. | H04W 16/14 |
| | | | | 455/450 |
| 2017/0006633 A1* | 1/2017 | Zhang | ............... | H04W 72/0406 |

* cited by examiner

SHARED SPECTRUM ACCESS

CROSS-REFERENCE TO RELATED APPLICATIONS

This application claims the benefit of U.S. Provisional Patent Application No. 62/008,209, entitled, "SHARED SPECTRUM ACCESS," filed on Jun. 5, 2014, which is expressly incorporated by reference herein in its entirety.

BACKGROUND

Field

Aspects of the present disclosure relate generally to wireless communication systems, and more particularly, to shared spectrum access among multiple tiers of users.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving, at a second tier transmitter, an indication of available shared spectrum resources, wherein the available shared spectrum resources includes one or more shared channels, determining, at the second tier transmitter, data for transmission, transmitting, by the second tier transmitter, a channel reserving signal during a clear channel assessment (CCA) period associated with the one or more shared channels, and transmitting, by the second tier transmitter, the data for transmission over the available shared spectrum resources.

In an additional aspect of the disclosure, a method of wireless communication includes receiving, at a third tier transmitter, an indication of available shared spectrum resources, wherein the available shared spectrum resources includes one or more shared channels, monitoring, by the third tier transmitter, a plurality of channels of the available shared spectrum resources for presence of at least one second tier transmitter, performing, by the third tier transmitter, a CCA on the one or more shared channels, and transmitting, by the third tier transmitter, data on the one or more shared channels in response to detecting the CCA as clear.

In an additional aspect of the disclosure, an apparatus configured for wireless communication includes means for receiving, at a second tier transmitter, an indication of available shared spectrum resources, wherein the available shared spectrum resources includes one or more shared channels, determining, at the second tier transmitter, data for transmission, means for transmitting, by the second tier transmitter, a channel reserving signal during a CCA period associated with the one or more shared channels, and means for transmitting, by the second tier transmitter, the data for transmission over the available shared spectrum resources.

In an additional aspect of the disclosure, an apparatus configured for wireless communication includes means for receiving, at a third tier transmitter, an indication of available shared spectrum resources, wherein the available shared spectrum resources includes one or more shared channels, means for monitoring, by the third tier transmitter, a plurality of channels of the available shared spectrum resources for presence of at least one second tier transmitter, means for performing, by the third tier transmitter, a CCA on the one or more shared channels, and means for transmitting, by the third tier transmitter, data on the one or more shared channels in response to detecting the CCA as clear.

In an additional aspect of the disclosure, a computer-readable medium having program code recorded thereon. This program code includes code to receive, at a second tier transmitter, an indication of available shared spectrum resources, wherein the available shared spectrum resources includes one or more shared channels, code to determine, at the second tier transmitter, data for transmission, code to transmit, by the second tier transmitter, a channel reserving signal during a CCA period associated with the one or more shared channels, and code to transmit, by the second tier transmitter, the data for transmission over the available shared spectrum resources.

In an additional aspect of the disclosure, a computer-readable medium having program code recorded thereon. This program code includes code to receive, at a third tier transmitter, an indication of available shared spectrum resources, wherein the available shared spectrum resources includes one or more shared channels, code to monitor, by the third tier transmitter, a plurality of channels of the available shared spectrum resources for presence of at least one second tier transmitter, code to perform, by the third tier transmitter, a CCA on the one or more shared channels, and code to transmit, by the third tier transmitter, data on the one or more shared channels in response to detecting the CCA as clear.

In an additional aspect of the disclosure, an apparatus includes at least one processor and a memory coupled to the processor. The processor is configured to receive, at a second tier transmitter, an indication of available shared spectrum resources, wherein the available shared spectrum resources includes one or more shared channels, to determine, at the second tier transmitter, data for transmission, to transmit, by the second tier transmitter, a channel reserving signal during a CCA period associated with the one or more shared channels, and to transmit, by the second tier transmitter, the data for transmission over the available shared spectrum resources.

In an additional aspect of the disclosure, an apparatus includes at least one processor and a memory coupled to the processor. The processor is configured to receive, at a third tier transmitter, an indication of available shared spectrum resources, wherein the available shared spectrum resources includes one or more shared channels, to monitor, by the third tier transmitter, a plurality of channels of the available shared spectrum resources for presence of at least one second tier transmitter, to perform, by the third tier transmitter, a CCA on the one or more shared channels, and to transmit, by the third tier transmitter, data on the one or more shared channels in response to detecting the CCA as clear.

DETAILED DESCRIPTION

Figure 1:
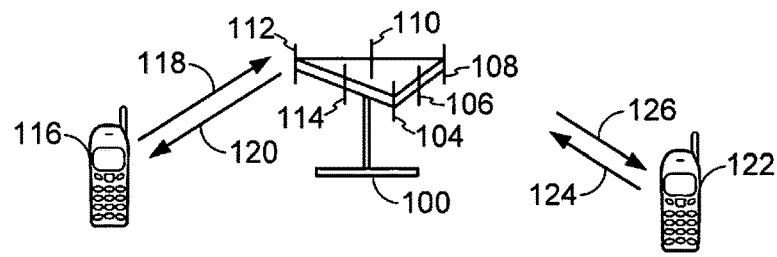
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). Cdma2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates details of an implementation of a multiple access wireless communication system, which may be an LTE system with authorized shared access (ASA), on which aspects as further described subsequently may be implemented. An evolved NodeB (eNB) 100 (also known as a base station, access point or AP) may include multiple antenna groups, one including 104 and 106, another including 108 and 110, and an additional including 112 and 114. In FIG. 1, only two antennas are shown for each antenna group; however, more or fewer antennas may be utilized for each antenna group. A user equipment (UE) 116 (also known as an user terminal, access terminal, or AT) is in communication with antennas 112 and 114, where antennas 112 and 114 transmit information to UE/access terminal 116 over forward link (also known as a downlink) 120 and receive information from UE 116 over reverse link (also known as an uplink) 118. A second UE 122 may be in communication with antennas 104 and 106, where antennas 104 and 106 transmit information to UE 122 over forward link 126 and receive information from access terminal 122 over reverse link 124.

In a frequency division duplex (FDD) system, communication links 118, 120, 124 and 126 may use different frequencies for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. That is, each antenna group is designed to communicate to UEs in a sector of the areas covered by eNB 100. In communication over forward links 120 and 126, the transmitting antennas of eNB 100 utilize beamforming in order to improve the signal-to-noise ratio of forward links for the different access terminals 116 and 122. Also, an eNB using beamforming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology. UEs, such as UE 116 and 122, may be further configured to operate with other nodes of other communication networks (not shown), such as, for example, GERAN and/or UTRAN networks. Moreover, base stations, such as eNB 100, may be configured to facilitate handover of served UEs to base stations of the other networks, such as through use of a redirection command.

Figure 2:
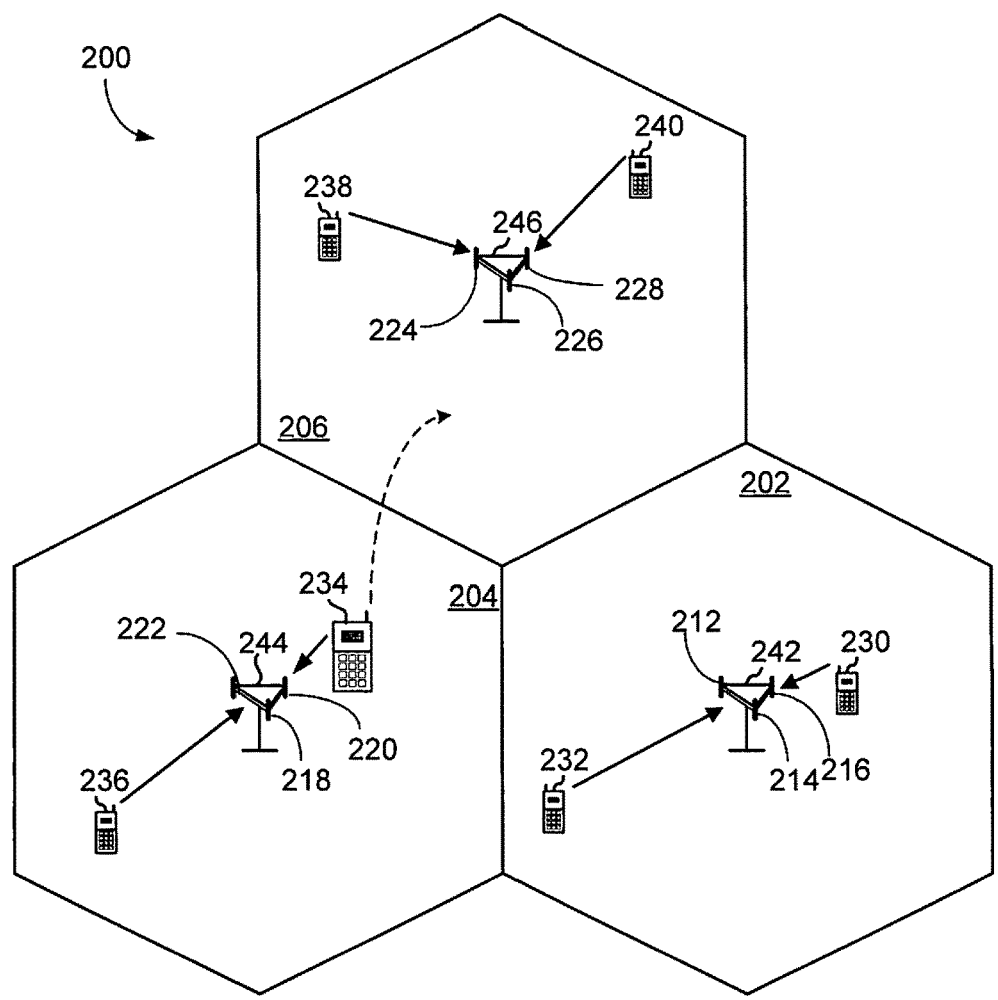
FIG. 2 is a block diagram illustrating details of a wireless communication system having multiple cells.
Figure 2:
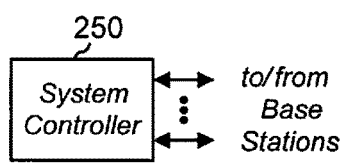

FIG. 2 illustrates details of an implementation of a multiple access wireless communication system 200, such as an LTE system with ASA, on which aspects, such as are described subsequently, may be implemented. The multiple access wireless communication system 200 includes multiple cells, including cells 202, 204, and 206. In one aspect, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204, and 206 can include several wireless communication devices, e.g., user equipment or UEs, which can be in communication with one or more sectors of each cell 202, 204, or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network or may provide connectivity to a core or backhaul network, including, for example, an MME and SGW, such as may be used to perform functions as further described herein related to multimode coordination and operation, as well as other aspects described herein.

An operator's system may include multiple networks, which may be of multiple types (for example, in addition to the LTE network configurations shown in FIGS. 2 and 3, including LTE network configurations that allow for use over any combination of licensed and unlicensed spectrum) using different RATs. For example, one type may be an LTE system, which is data-centric. Another type may be a UTRAN system, such as a W-CDMA system. Yet another type may be a GERAN system, which may in some cases be dual transfer mode (DTM) capable (also denoted herein as a DTM GERAN). Some GERAN networks may be non-DTM capable. Multimode user terminals, such as UEs, may be configured to operate in multiple networks, such as these, as well as other (e.g., WiFi or WiMax networks, etc.).

Authorized shared access (ASA) is a spectrum licensing model in which portions of spectrum unused in time, geography, and/or frequency by the incumbent system(s) (also referred to herein as the primary licensee), often a governmental agency, such as the military, are granted via a regulatory license to a commercial licensee(s) enabling the provision of the commercial services on the spectrum when and where the spectrum is not used by the primary or incumbent system(s). An architecture for implementing ASA is described herein, illustrating an implementation of ASA technology but not limiting the technology to the illustrated embodiments.

The following terminology is used in the present disclosure:

| | |
|---|---|
| ASA-1 | The interface between the primary licensee and the ASA controller |
| ASA-2 | The interface between the ASA controller and the ASA network management system |
| ASA-3 | The interface between the ASA network manager and the ASA network elements |
| ASA Controller | The entity that receives information from the network controller on what ASA spectrum is available for use by an ASA network and sends control information to the ASA network manager to notify it what ASA spectrum is available |
| ASA Network Manager | An entity operated by the ASA network operator which controls and manages its network, including but not limited to the devices operating in the ASA spectrum |
| ASA licensee | A wireless network operator that has obtained an ASA license to use ASA spectrum |
| Authorized Shared Access | A type of spectrum licensing where ASA operators utilize portions of spectrum that are unused by the primary licensee |
| ASA Spectrum | Spectrum that is not fully utilized by a primary licensee and has been licensed for use by an ASA operator. ASA spectrum availability is specified by location, frequency and time. |
| Exclusion Zone | A geographic region in which an ASA network is not permitted to operate, so as to protect an incumbent or primary system. |
| Incumbent or Primary ASA licensee | The entity originally holding the right to utilize a band of frequencies that continues to utilize the frequency band, |

| | -continued |
|---|---|
| | but which does not use the entire frequency band, in all locations at all times. |
| Incumbent Network Controller | An entity operated by the incumbent or primary licensee which controls and manages its network that operates in the ASA spectrum |

Figure 3:
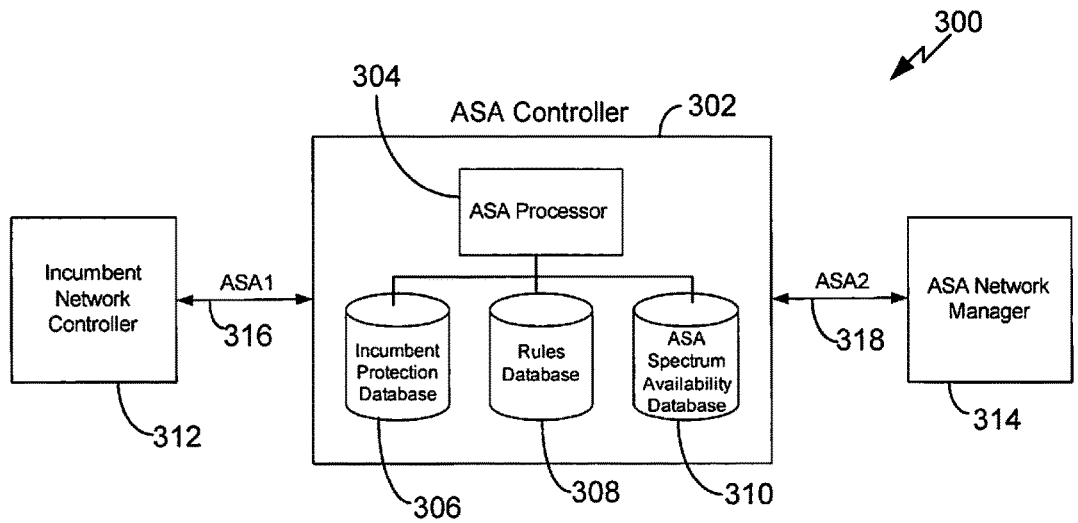
FIG. 3 is a block diagram showing aspects of an Authorized Shared Access (ASA) controller coupled to different wireless communication systems including one primary system and one secondary system.

Various entities are used to implement the ASA architecture. In one aspect, an ASA architecture 300 may include an ASA controller 302 coupled to a network controller 312 of a single incumbent or primary system and an ASA network manager 314 of a single ASA network, as shown in FIG. 3. The incumbent system may be a primary ASA licensee and the ASA network may be a secondary ASA licensee.

The network controller 312 is aware of how the ASA spectrum is used by the incumbent or primary system at specified times and locations. It provides information to the ASA controller 302 on the incumbent or primary user usage of the ASA spectrum. There are several methods that the network controller 312 can use to provide this information to the ASA controller 302. For example, the network controller 312 may specify a set of exclusion zones along with exclusion times. Another option is for the network controller 312 to specify the maximum allowed interference at a set of locations. The network controller 312 sends this incumbent or primary user protection information to the ASA controller 302 over an ASA-1 interface 316, aspects of which are described in more detail below. Incumbent or primary user protection information may be stored by the ASA controller 302 in a database 306.

The ASA controller 302 uses the information from the network controller 312 to determine what ASA spectrum can be used by the ASA network. The method used by the ASA controller 302 to determine what ASA spectrum may be used at any given time for any given location is specified in a rules database 308 accessed by an ASA processor 304. The rules database 308 stores regulatory rules. These rules may not be modified through either the ASA-1 or the ASA-2 interfaces, and may be updated by the individual or organization that manages the ASA controller 302. What ASA spectrum is available, as calculated by the rules in the rules database 308, may be stored in the ASA spectrum availability database 310.

The ASA controller 302 may send information to the ASA network manager 314 on what ASA spectrum is available via an ASA-2 interface 318, based on the spectrum availability database. The ASA network manager 314 may know or determine the geographic location of base stations under its control and also information about the transmission characteristics of these base stations, including transmit power, supported frequencies of operation, etc. The ASA network manager 314 may query the ASA controller 302 to discover what ASA spectrum is available in a given location or a geographic region. Also, the ASA controller 302 may notify the ASA network manager 314 of any updates to the ASA spectrum availability in real-time. This allows the ASA controller 302 to notify the ASA network manager 314 if ASA spectrum is no longer available, so that the ASA network can cease using that spectrum, so that network controller 312 can obtain exclusive access to the ASA spectrum in real time.

The ASA network manager 314 may be embedded in a standard network element, depending on the core network technology. For example, if the ASA network is a long term evolution (LTE) network, then the ASA network manager may be embedded in an operations, administration and maintenance (OAM) server. More information about interfaces ASA-1 and ASA-2 can be found in the disclosure below.

In FIG. 3, a single network controller 312 and a single ASA network manager 314 are illustrated both connected to the ASA controller 302. It is also possible for multiple ASA networks (e.g., ASA network A, ASA network B and ASA network C) to be connected to an ASA controller 402, as in a system 400 shown in FIG. 4. ASA network A includes an ASA network A manager 414 coupled to the ASA controller 402, ASA network B includes an ASA network B manager 420 coupled to the ASA controller 402, and ASA network C includes an ASA network C manager 422 coupled to the ASA controller 402. In this case, the multiple ASA networks may share the same ASA spectrum. There are several ways in which this sharing of the ASA spectrum can be accomplished. One method is for in a given region, each network is restricted to a subband within the ASA spectrum. How each ASA network obtains rights to each subband is outside the scope of this document and may be addressed in the regulatory spectrum auctioning process. Another method for the ASA networks to share the ASA spectrum is using tight timing synchronization and scheduling of the channel access of the different networks. This ASA sharing approach has been studied for LTE networks, as an example. The system 400 may further include an network controller 412 of an incumbent or primary system communicating with the ASA controller 402 via an ASA-1 interface 416, to provide incumbent or primary user protection information for a database 406 (similar to the database 308 in FIG. 3). The ASA controller 402 may include a processor 404 coupled to a rules database 408 (similar to the rules database 308 in FIG. 3) and ASA spectrum availability database 410 (similar to the ASA spectrum availability database 310 in FIG. 3). The ASA controller 402 may communicate with the ASA network managers 414, 420 and 422 via an ASA-2 interface 418. The incumbent or primary system may be a primary licensee, and the ASA networks A, B, C may be secondary licensees.

Figure 5:
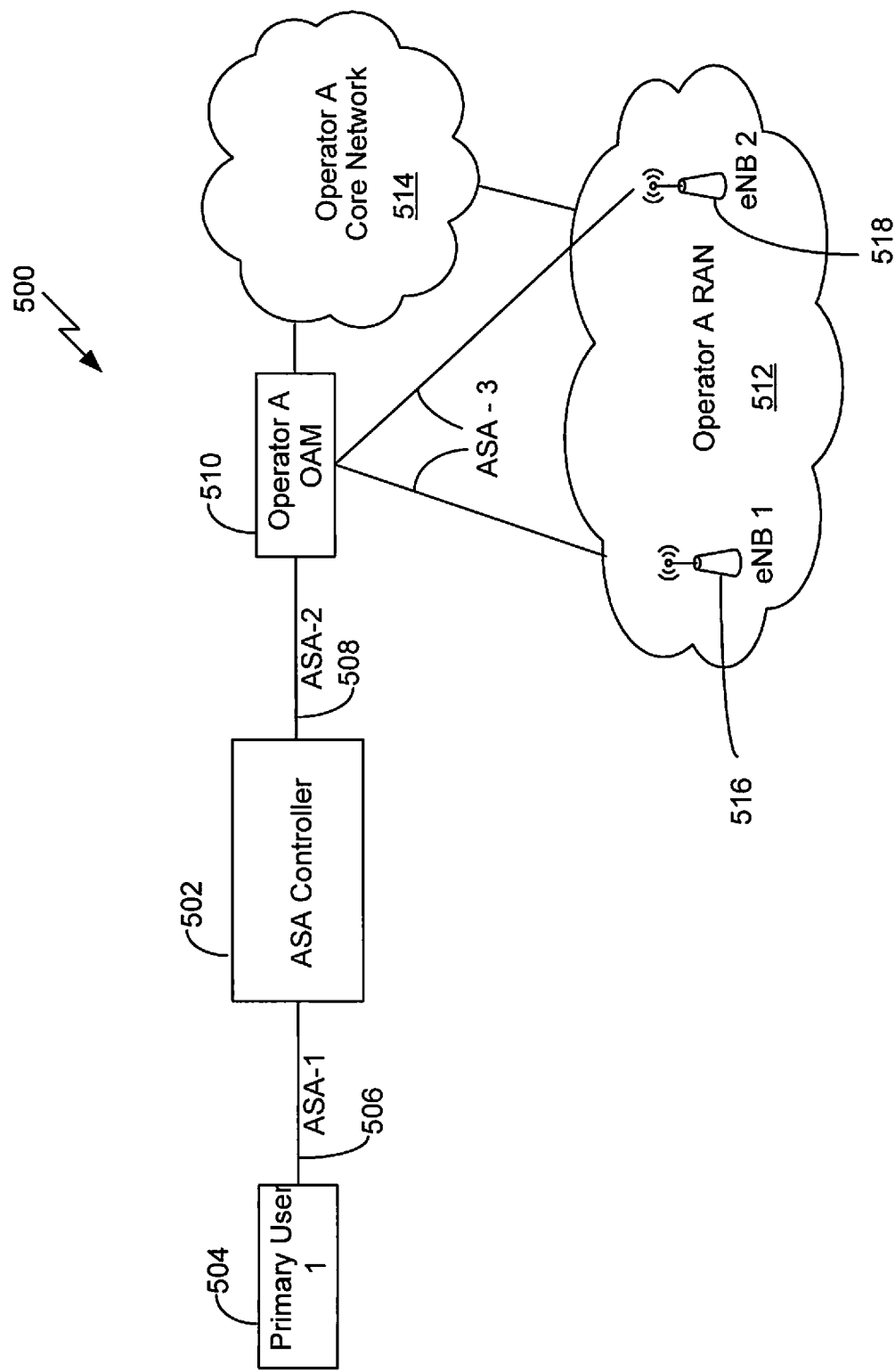
FIG. 5 is a block diagram showing aspects of an ASA controller coupled to different wireless communication systems and elements within a secondary system for supporting ASA.

The ASA network manager(s) may need to interact with various network elements, such as eNBs to achieve the desired spectrum use control. This can be facilitated by the use of an ASA-3 interface as shown in FIG. 5, showing a system 500 including ASA-3 interfaces between the eNBs 516, 518 in the Radio Access Network 512 and an ASA network manager node embedded in an OAM 510. The Radio Access Network 512 may be coupled to a core network 514. An ASA controller 502 may be coupled to the OAM 510 via an ASA-2 interface 508 and to a primary user (licensee) node (e.g., network controller) 504 via an ASA-1 interface 506.

It is also possible to have multiple network controllers 504 for the same ASA spectrum. A single network controller can provide complete information about incumbent or primary user protection for a given ASA frequency band. For that reason, the architecture may be limited to a single network controller. However, it is noted that multiple network controllers may be supported, but it may be more straightforward and more secure to limit it to a single network controller.

Figure 4:
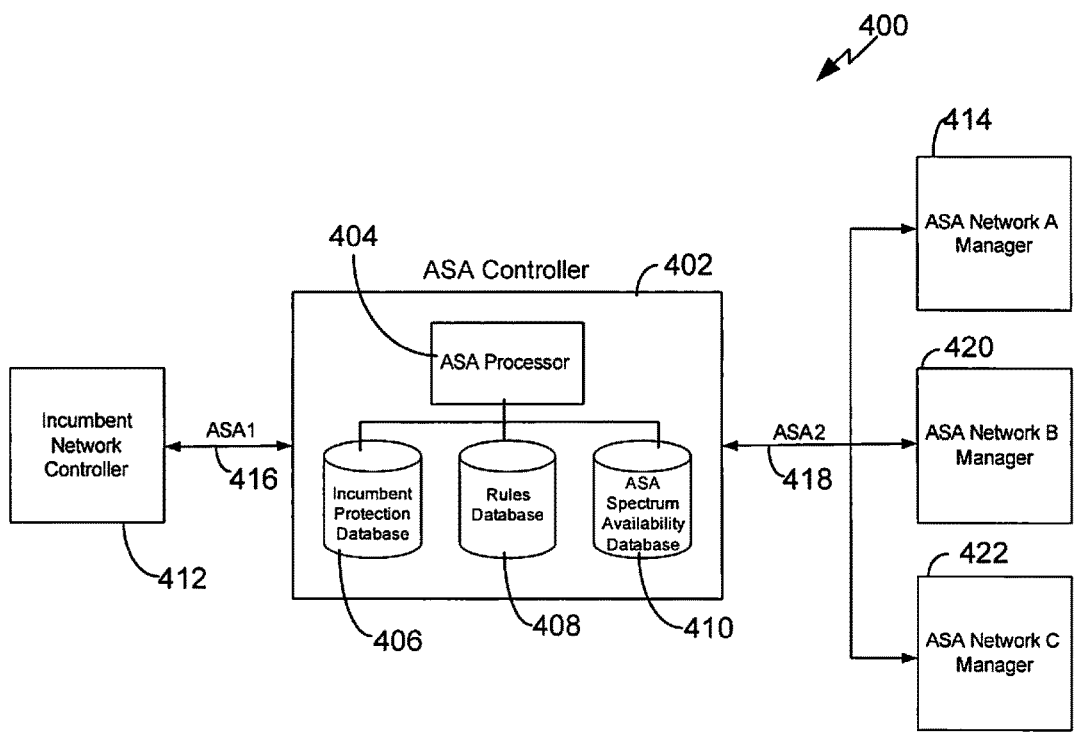
FIG. 4 is a block diagram showing aspects of an ASA controller coupled to different wireless communication systems including one primary system and multiple secondary systems.

The aforementioned elements of FIGS. 3-5 are not limited to an ASA architecture. Rather, the elements of FIGS. 3-5 are also contemplated to be used for other shared access systems, such as a multi-tiered shared access system.

As discussed above, authorized shared access (ASA) provides temporary access to a band specified for an incumbent system or user, such as a national defense organization. In one configuration, the incumbent user discloses its time-varying requirements to the authorized shared access system and the authorized shared access controller determines resource grants for the mobile network operator based on the disclosed time-varying requirements. That is, the mobile network operator is granted access to spectrum resources that are made available (i.e., unused) by the incumbent user. In the present disclosure, spectrum resources may be referred to as resources.

Furthermore, in the present disclosure, spectrum resources may refer to spectrum usage in space. As an example, a spectrum band F may be available in zone Y. In the present example, a portion of the band (F1) may be specified for a specific geographical area (Y1) for zone Y. Thus, in the present example, the remaining band (F-F1) may be available in all the zone Y. Furthermore, the portion of the band (F1) may be available outside of the specific geographical area (Y1).

In some cases, it may be desirable to add additional granularity to the spectrum sharing. Aspects of the present disclosure are directed to a multi-tier system, such as a three-tier system, for sharing spectrum resources. In one configuration, the spectrum resources may be resources from the 3.5 GHz band. Additionally, in one configuration, a three-tier system includes a first spectrum tier specified for incumbent systems/users, a second spectrum tier specified for priority access systems/user (e.g., emergency services), and a third spectrum tier specified for general access systems/users. The general access systems may be unlicensed systems. In the present disclosure, systems specified for a spectrum tier may also be referred to as users. Furthermore, in the present disclosure, a spectrum tier may also be referred to as a tier. Although three tiers are described, the present disclosure also contemplates four or more tiers.

Figure 6:
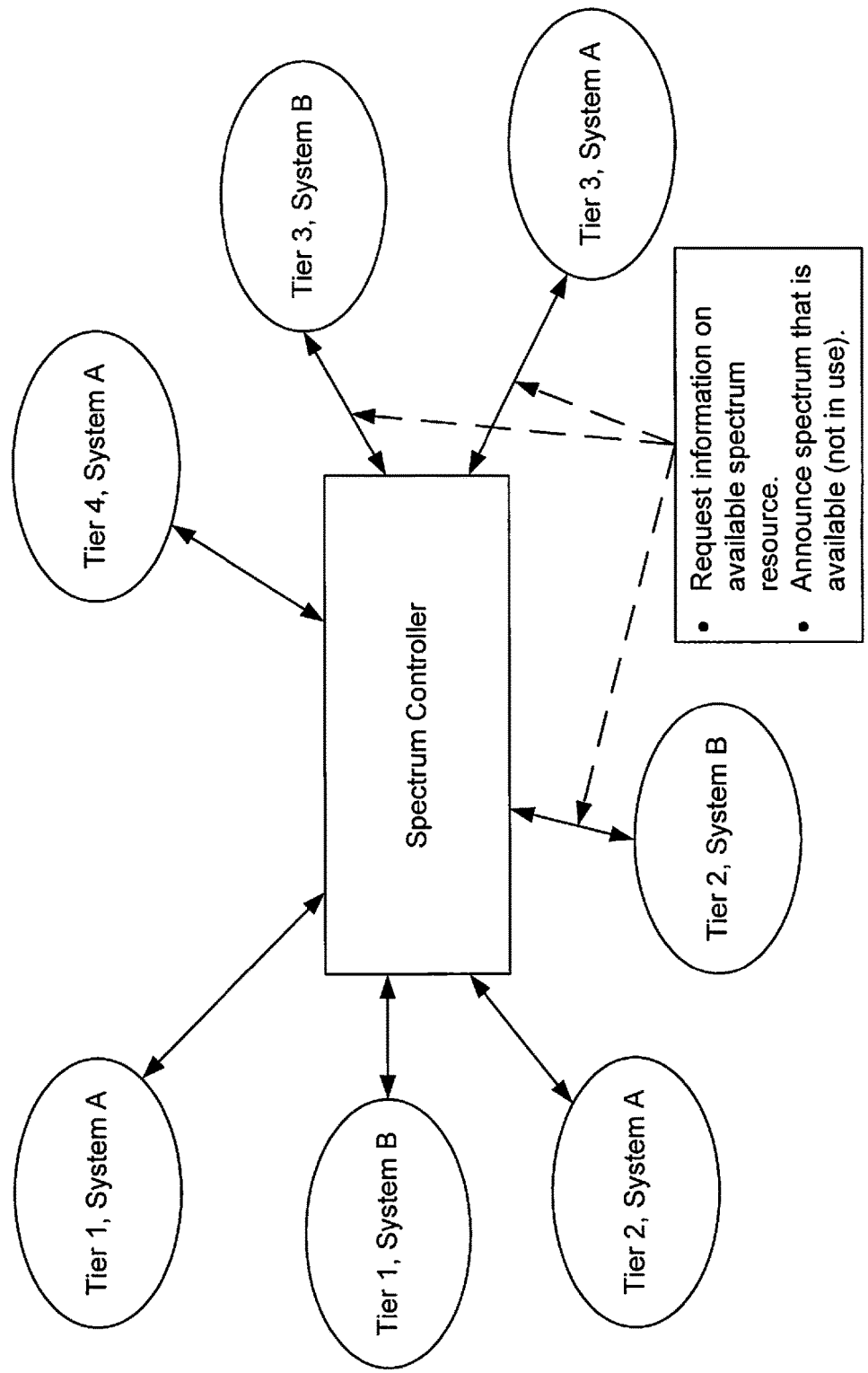
FIG. 6 is a block diagram illustrating a multi-tiered system according to aspects of the present disclosure.

FIG. 6 illustrates a block diagram illustrating a multi-tiered system according to an aspect of the present disclosure. As shown in FIG. 6 the multi-tiered system may have multiple tiers 1-4. Each tier may be specified for particular systems, such as incumbent systems, general access systems, and/or priority access systems. In one configuration, a spectrum controller may receive information from a higher level tier indicating unused spectrum. The spectrum controller may then inform a lower level tier of available spectrum based on the indicated unused spectrum.

For example, system A of the first tier may report its unused spectrum to the spectrum controller. Furthermore, in the present example, based on the unused spectrum of system A of the first tier, the spectrum controller may notify the systems, such as system A and system B, of the second tier of the available spectrum. Moreover, the systems of the second tier may report the unused spectrum available from the first tier to the spectrum controller and the spectrum controller may then notify the system of the third tier of the available spectrum based on the unused spectrum of the second tier and first tier. Finally, the systems of the third tier may report their unused spectrum available from the second tier to the spectrum controller and the spectrum controller may then notify the system of the fourth tier of the available spectrum based on the unused spectrum of the third tier, second tier, and first tier. Although each tier is described as managed separately, multiple licensees within a tier can be managed by one entity, while other licensees can be managed by another entity. For example, there can be fixed boundaries on resources allocated to each system, or some other management approach.

As suggested above, the available wireless spectrum usable for wireless communication may be shared in multiple ways. Vertical sharing is sharing of the spectrum between an incumbent or primary system and one or more other systems. In one example, an incumbent or primary user may be a governmental entity, such as an agency or a branch of military. The incumbent or primary user may not use the spectrum at all times, on nationwide basis, or in its entirety. In that case, the regulatory authority may license one or more commercial entities to use the spectrum when and where it is not used by the primary or incumbent user. In vertical sharing, there are no common customers between the incumbent/primary user and secondary users. Spectrum may also be shared horizontally. In horizontal sharing, spectrum is shared between competing systems. There may or may not be an incumbent or primary user in a horizontal sharing scenario. If one is present, the incumbent or primary user may introduce an asymmetric hierarchy of priority. For example, some users may have priority to access the spectrum over others. In horizontal sharing schemes, there may be common customers between the incumbent or primary user, if present, and other users. For example, in some portion of the 5 GHz unlicensed bands, there are no licensed incumbents or primary users. Thus, there is parity between all users. However, in other bands, the spectrum may be licensed to a single company, but with access leased to multiple secondary users, such as wireless internet service providers (WISPs).

In vertical sharing scenarios, there are generally two licensing paradigms: strict licensing and hybrid licensing. ASA, as referenced above, falls into the strict licensing paradigm and may also be referred to as Licensed Shared Access (ASA or LSA). ASA licensees acquire certain access rights from the regulator in a binary spectrum sharing arrangement between the incumbent or primary user and ASA licensee. Hybrid licensing, which may be referred to as Spectrum Access System (SAS), provides an asymmetric hierarchy between non-incumbent or primary users, in which one set of users (e.g., Second Tier Users or "2T") will have priority in accessing the spectrum over others (e.g., 3T, 4T, etc. For example, the 3.5 GHz spectrum in the United States is currently occupied by the United States government, i.e, the U.S. Navy (the primary or incumbent user). Mobile network operators (MNOs) and others are hoping to obtain licenses for the spectrum. The entities that have priority over other accessing entities and may be referred to as Second-tier access licensees (2Ts) Other users that may access the 3.5 GHz spectrum are third-tier users or 3T, which is sometimes referred to as general authorized access (GAA) users. These 3T users may access the 3.5 GHz spectrum, but the 2T users have priority in access.

Various aspects of the present disclosure are directed to hybrid licensing through SAS. SAS according to the present disclosure allow for three tiers of users with a strict hierarchy in priority from the super-priority incumbent, to the priority 2T users, to the 3T users. SAS according to the present disclosure also employ a network-controlled architecture, such that individual devices do not register with a SAS database. Moreover, SAS deployments ensure a predictable QoS to 2T users.

Various SAS deployments according to the present disclosure may degenerate to the ASA model, when only two tiers (e.g., incumbent and 2T users) are present, and may degenerate to an unlicensed model when only a single third tier (e.g., 3T users) is present.

Figure 7:
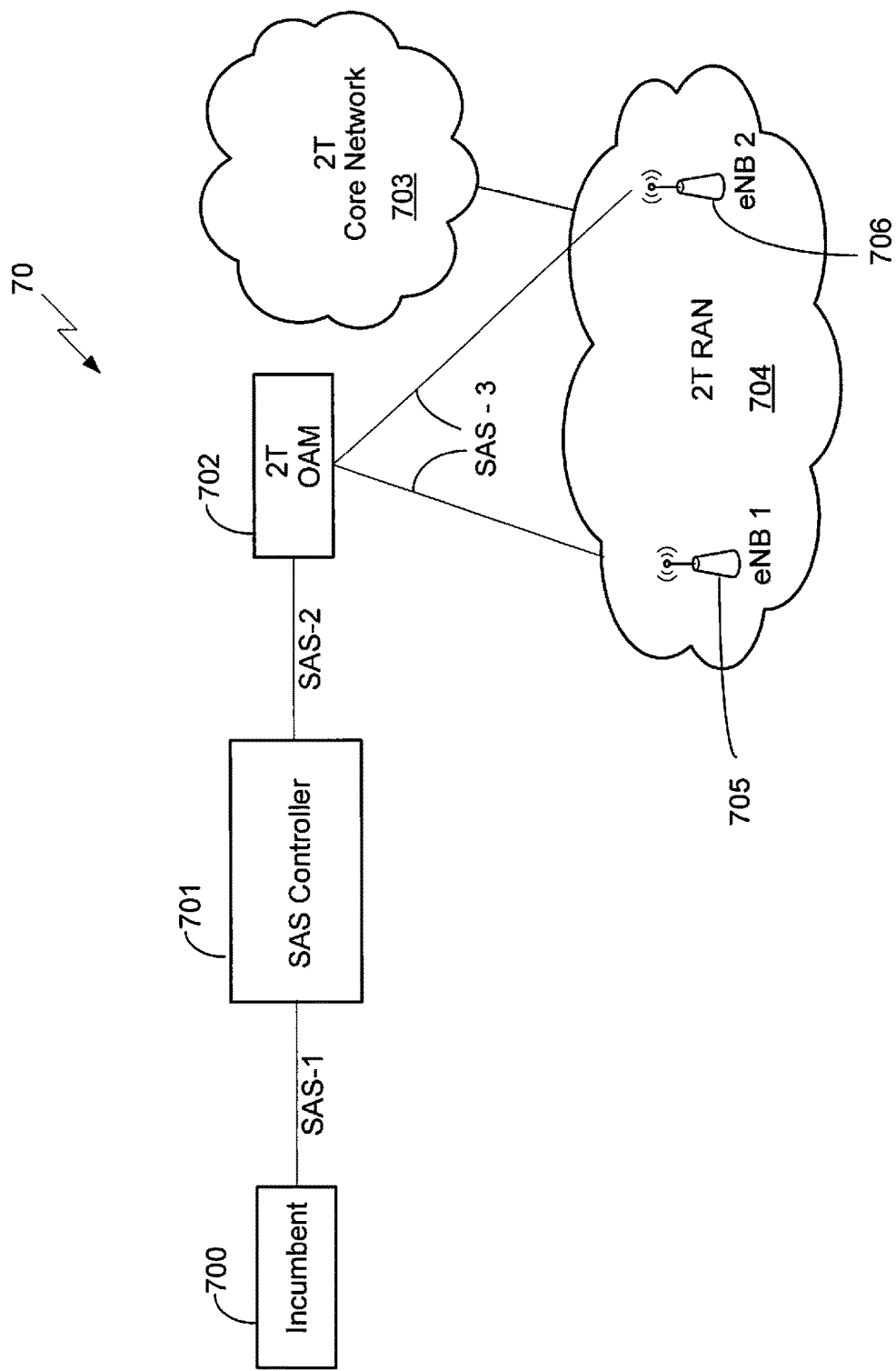
FIG. 7 is a block diagram illustrating a Shared Access Spectrum (SAS) deployment configured according to one aspect of the present disclosure.

FIG. 7 is a block diagram illustrating a SAS deployment 70 configured according to one aspect of the present disclosure. SAS deployment 70 illustrates the network when only two tiers of spectrum sharing are present. An incumbent user 700 maintains the primary connection with a SAS controller 701 over a SAS-1 interface. The SAS-1 interface is identical in features and functionality to the ASA-1 interface, as described above with regard to ASA deployments. The spectrum shared through SAS deployment 70 is managed at the 2T operations, administration and maintenance (OAM) server 702 via a SAS-2 interface. The SAS-2 interface is identical in features and functionality to the ASA-2 interface, as described above. Thus, with only two tiers available at a given time in SAS deployment 70, the SAS model degenerates to the strict licensing LSA/ASA model.

2T core network 703 administers 2T OAM server 702 in controlling access to the shared spectrum of SAS deployment 70. 2T radio access network 704 interacts through 2T OAM server 702 in providing authorized access to the shared spectrum by eNBs 705-706. SAS deployment 70 provides access to the shared spectrum by 2T RAN 704 using regular LTE access technology over licensed spectrum as well as LTE/LTE-A access technology using any combination of licensed and unlicensed spectrum for supplemental downlink (SD) or carrier aggregation (CA) modes.

Figure 8:
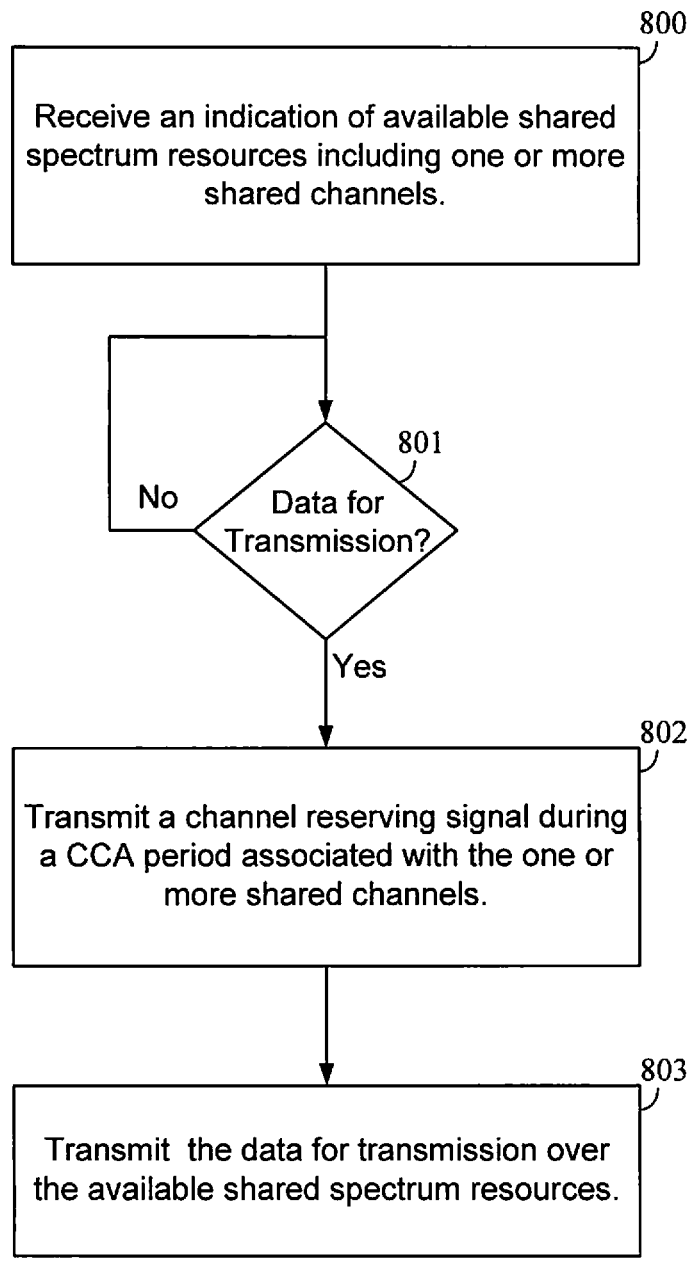
FIG. 8 is a functional block diagram illustrating example blocks executed to implement one aspect of the present disclosure.

FIG. 8 is a functional block diagram illustrating example blocks executed to implement one aspect of the present disclosure. At block 800, a second tier transmitter, such as a 2T transmitter, receives an indication of the available shared spectrum resources, including one or more shared channels. For example, the indication may be received from a first spectrum tier, such as the incumbent, or may be received from another second tier transmitter, or the like. These shared channels may be licensed, unlicensed, or various combinations thereof. This first block checks the status of the available spectrum. The second tier or 2T transmitters obtain the indication from the 2T OAM server querying the SAS controller and database using the SAS-2 interface. The 2T OAM server receives the spectrum status, including information, such as the maximum allowed receiver power spectral density in time, geography, channel, and the like. This information along with access information to the shared spectrum resources is provided to the base stations in the 2T associated with the querying 2T OAM server.

At block 801, the second tier transmitter determines whether or not it has data to transmit. The 2T base stations or other transmitters will determine whether there is data for transmission onto the SAS network deployment. If no data is currently detected for transmission, the second tier transmitter will continue to monitor for such transmission data.

If the second tier transmitter determines that it has data to transmit, then, at block 802, the second tier transmitter, such as a 2T base station, transmits a channel reserving signal during a clear channel assessment (CCA) period associated with any shared channels within the available spectrum. The channel reserving signal may include transmission of the data itself, or transmission of any other type of signal, such as a CUBS, or the like. A CCA may be performed by a transmitter attempting to transmit onto a shared channel. The purpose is for the transmitter to detect whether or not the shared channel is already in use or whether another transmitter is transmitting signals over the shared channel. If the transmitter performing the CCA check fails to detect a clear channel, the transmitter will back off transmissions on that channel for a length of time before re-trying the CCA check. For example, CCA may be performed when attempting to transmit onto licensed or unlicensed channels.

At block 803, the second tier transmitter transmits the data for transmission over the available shared spectrum resources. These available shared spectrum resources may also include any combination of licensed and unlicensed channels. The second tier transmitters, such as the 2T base stations or eNBs, may transmit using any of the available shared channels. However, because the 2T transmitters already have the exclusive right to these channels from the SAS controller, the 2T transmitters may access the shared channels without first detecting a clear channel. This transmission is safeguarded through block 802, when the signal is transmitted during the CCA period. Therefore, any 3T users that may be in the area would be prevented from transmission on the shared channel because the 2T transmission during CCA period denies medium access to 3T users.

Figure 9:
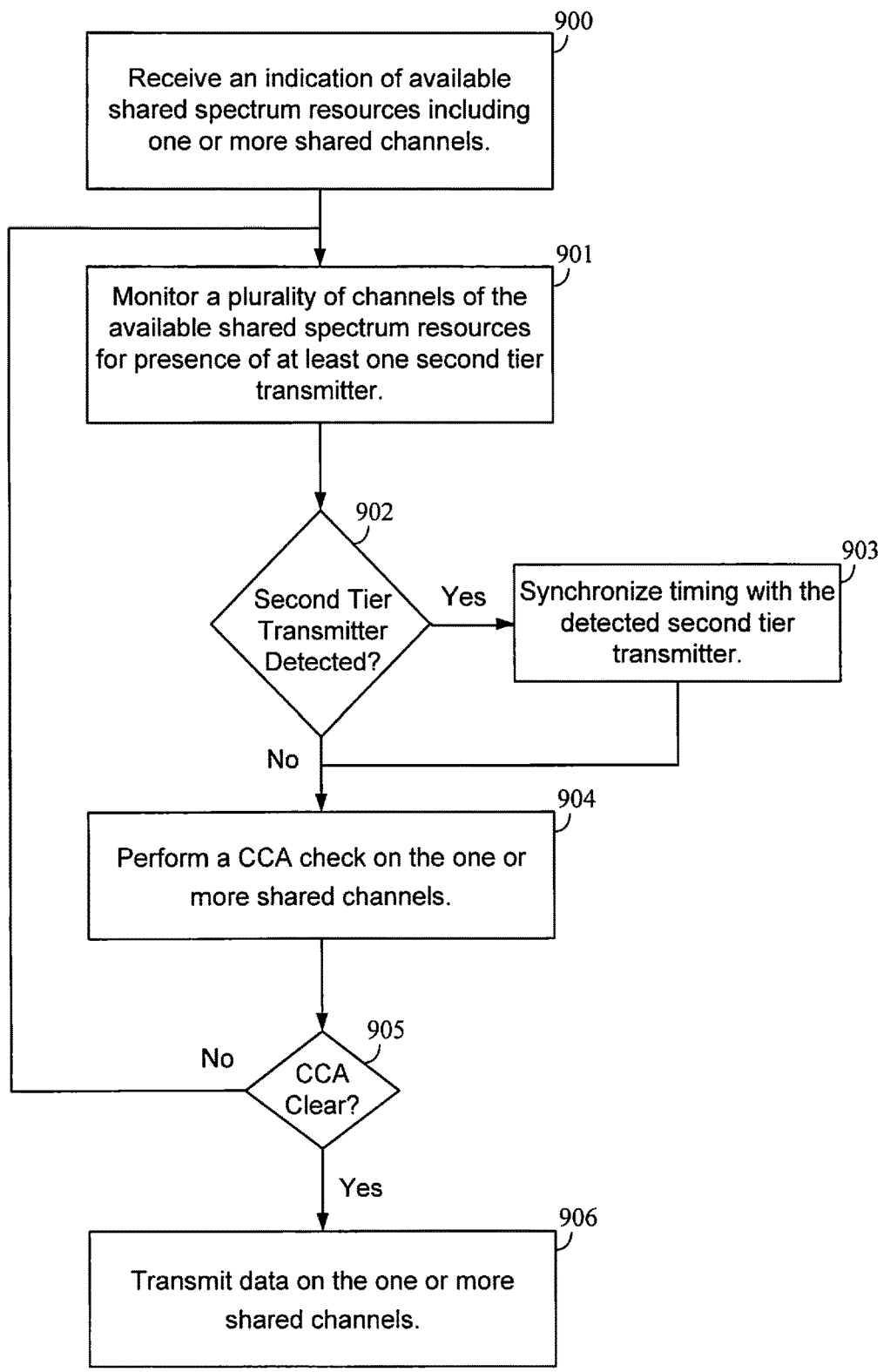
FIG. 9 is a functional block diagram illustrating example blocks executed to implement one aspect of the present disclosure.

FIG. 9 is a functional block diagram illustrating example blocks executed to implement one aspect of the present disclosure. At block 900, a third tier transmitter receives an indication of the availability of shared spectrum resources that include one or more shared channels. For example, the indication may be received from a first spectrum tier, such as the incumbent, or may be received from another second tier transmitter, or the like. These shared channels may include any combination of licensed and unlicensed channels. A third tier transmitter may include a 3T base station or eNB or a 3T radio access network that facilitates communications of multiple 3T eNBs within the radio access network. The third tier transmitter checks the status of available shared spectrum resources by querying the SAS controller and database using the SAS-2 interface. The indication received includes the spectrum status along with information, such as the maximum allowed receiver power spectral density in time, geography, channel, and the like.

At block 901, the third tier transmitter monitors a plurality of channels of the available shared spectrum resources for the presence of at least one second tier transmitter. The 3T base stations attempt to detect the presence of any 2T base stations in all available channels. The 3T base stations monitor for any synchronization signals and system information transmitted by 2T base stations.

At block 902, a determination is made whether a second tier transmitter has been detected. If so, then, at block 903, the third tier transmitter synchronizes its timing to the detected second tier transmitter. A 3T base station, upon detecting a 2T transmitter synchronizes its timing to the 2T transmitter, thus, coupling with the 2T system.

At block 904, the third tier transmitter performs a CCA check of the shared channels of the available shared spectrum resources. Thus, when a 2T user is detected, the 3T user may either select one of the channels on which a 2T user is not detected or, if the 2T user is detected on all channels, then the 3T user may occupy the same channel as the 2T user. However, because the 3T user must perform a CCA check before transmission onto the shared channels, it may not interfere with any 2T transmissions, as the 2T user, when it has data to transmit, will always transmit a signal during the CCA period, which will cause the 3T user's CCA check to fail.

At block 905, if the third tier transmitter fails to detect a clear CCA, then, the third tier transmitter monitors again for presence of the second tier transmitter, at block 901. Otherwise, if the third tier transmitter detects a clear CCA, then, at block 906, the third tier transmitter will transmit the data on the shared channel.

The 3T user, when monitoring for 2T user presence, may detect a 2T user on all of the channels or on fewer than all of the channels. As noted above, if the 2T user is only detected on some of the available shared channels, then the 3T user may select an "open" channel on which to perform a CCA check and potentially transmit. Otherwise, when the 2T user is detected on all available shared channels, the 3T user may occupy the same channel and simply transmit only when all LBT protocols can be successfully met. With the presence of the 2T user detected, the synchronization of timing between the 3T user and 2T user will allow the CCA periods of the 3T and 2T users to overlap. Because the 2T users transmit a signal during the CCA period, the synchronized timing will increase the likelihood that the 3T user will detect the 2T user's transmission during CCA check and prevent the 3T user from transmitting interfering signals. This ensures the quality of service for the 2T users, which have priority over 3T users.

It is also possible that the 3T user does not detect any 2T user. In such a scenario, the 3T transmitter will not have an opportunity to synchronize timing with a 2T transmitter. However, because the 3T user must always perform a CCA check prior to transmitting on the shared channels, the likelihood of a collision with 2T transmissions is lower. With this potential scenario, it may be beneficial to select a period for the 3T user to repeat monitoring for 2T presence that is not too long (e.g., 10-60 seconds). Slave downlink system timing to 2T. This ensures CCA timing is aligned across 2T and 3T in the channel.

Figure 10:
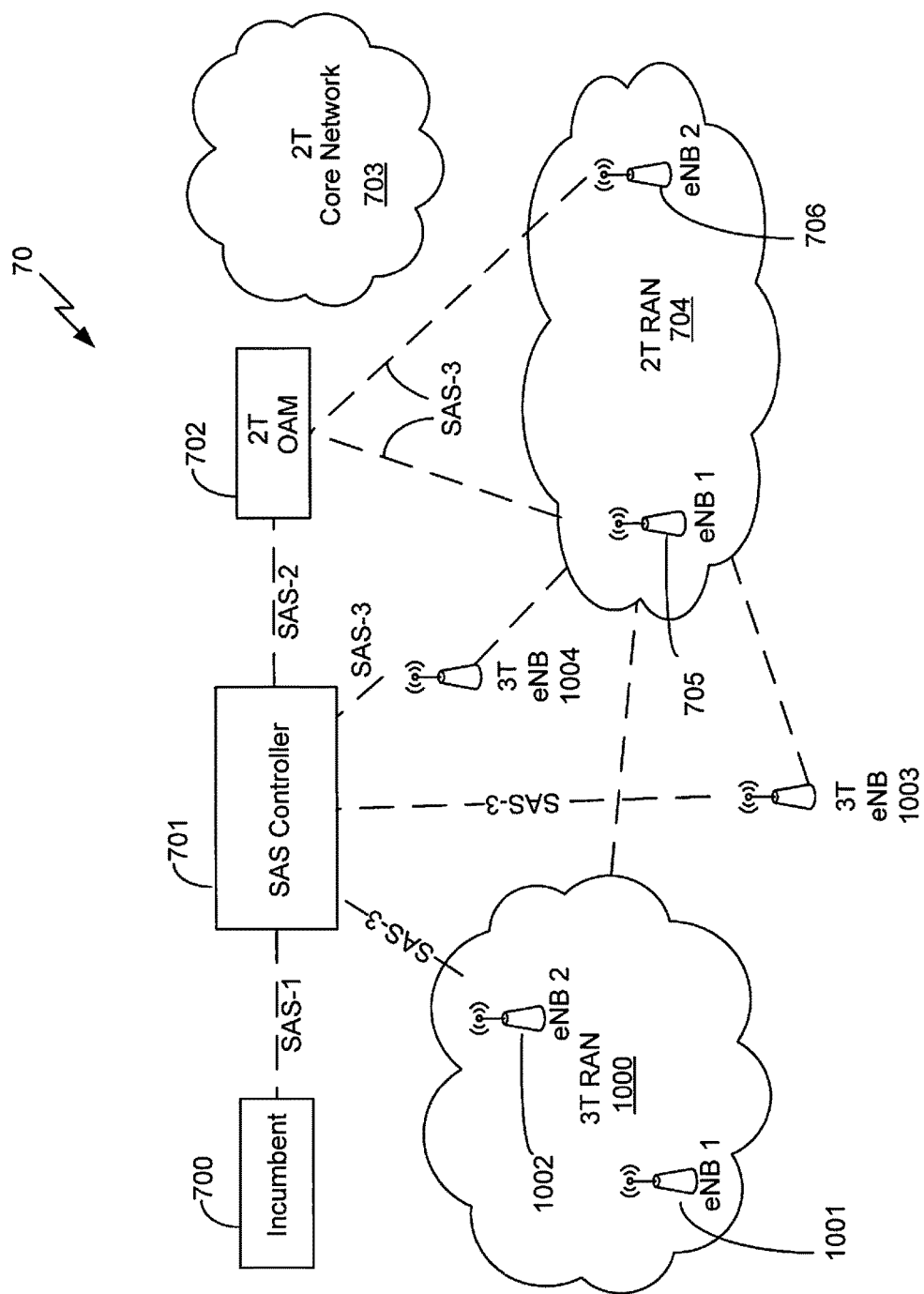
FIG. 10 is a block diagram illustrating SAS deployment configured according to one aspect of the present disclosure.

FIG. 10 is a block diagram illustrating SAS deployment 80 configured according to one aspect of the present disclosure. SAS deployment 80 illustrated in FIG. 10 shows a different time instance than the illustration of SAS deployment 80 in FIG. 8. At the time period illustrated in FIG. 10, 3T users are now present. Incumbent 800 continues to maintain the primary connection with SAS controller 801 over the SAS-1 interface. The spectrum shared with 2T users through SAS deployment 80 continue to be managed at 2T OAM server 802 via the SAS-2 interface, with access to the shared spectrum resources provided to eNBs 805-806 of 2T RAN 804 and 2T core network 803. However, 3T users now also directly interact with SAS controller 801 over a SAS-3 interface to manage third tier access to the shared spectrum resources. The SAS-3 interface provides a direct interface between SAS controller 801 and 3T base stations, such as 3T eNBs 1001-1002, served in 3T-1 RAN 1000, and 3T eNBs 1003-1004.

The 3T user deployments of 3T eNBs 1001-1004 may use the Standalone mode of LTE/LTE-A with unlicensed spectrum. Because 2T users are present in SAS deployment 80, 3T eNBs 1001-1004 detect the presence and synchronize timing with 2T eNBs 805-806. The synchronization to the 2T users is illustrated by sync connectors 1005-1007. As noted above, the synchronization of the 3T and 2T users allows the signals transmitted by eNBs 805-806 during the CCA period to be detected by 3T eNBs 1001-1004, such that the unlicensed channels will be protected for transmission by the 2T users. Only when the 2T users are not transmitting will the 3T users' CCA check be clear in order to allow data transmissions of the 3T users over the unlicensed channels.

Figure 11:
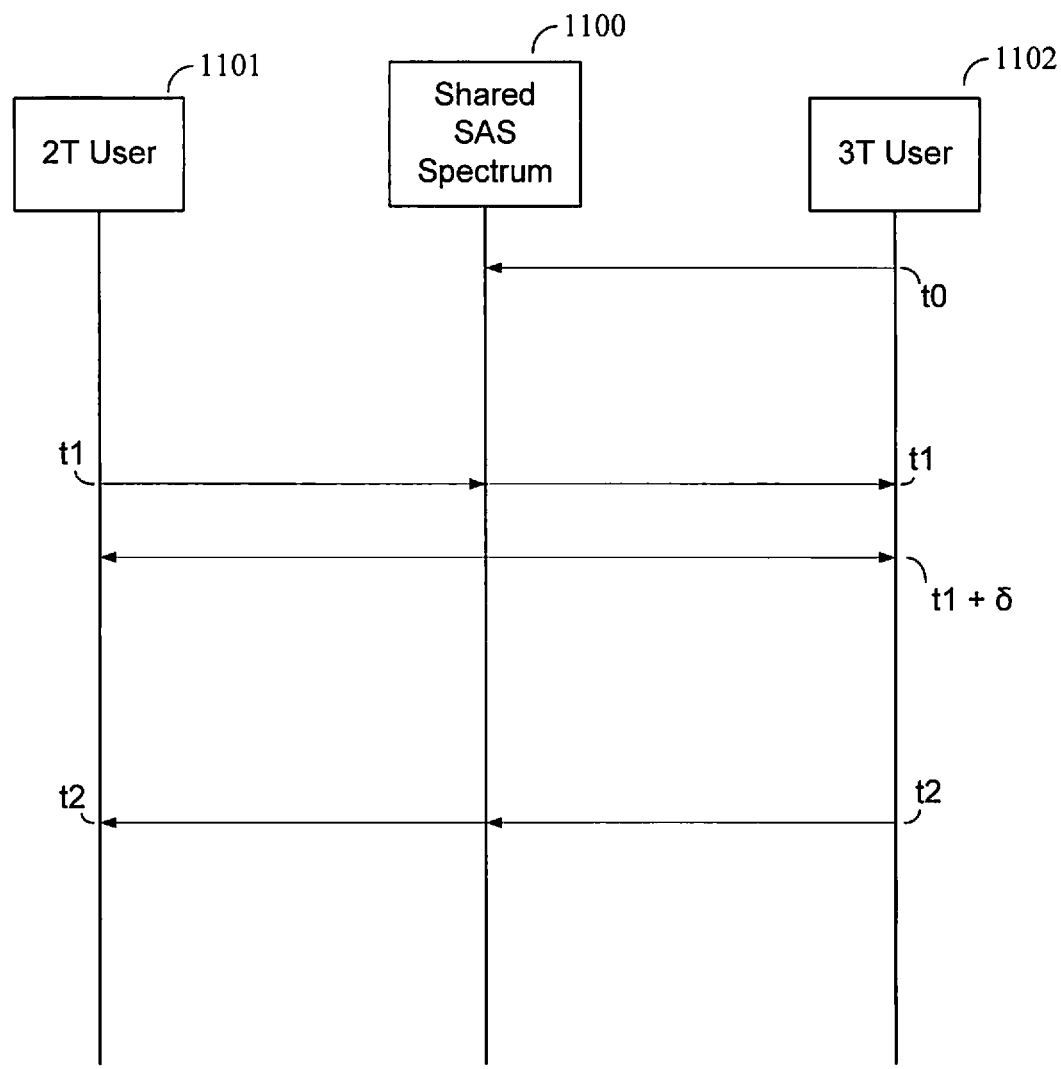
FIG. 11 is a timeline illustrating a SAS deployment configured according to one aspect of the present disclosure.

FIG. 11 is a timeline illustrating an SAS deployment configured according to one aspect of the present disclosure. The SAS deployment includes unlicensed SAS spectrum 1100 available for sharing between 2T user 1101 and 3T user 1102. At time, t0, 2T user 1101 does not use shared SAS spectrum 1100. Accordingly, 3T user 1102 occupies and uses shared SAS spectrum 1100. 3T user 1102 performs CCA checks before any transmissions beginning on access to shared SAS spectrum 1100 at time, to. At time, t1, 2T user 1101 detects that it has data for transmission and accesses shared SAS spectrum 1100. 2T user 1101 accesses shared SAS spectrum 1100 without performing a CCA check. With 2T user 1101 accessing shared SAS spectrum 1100 at time, t1, 3T user 1102 detects the presence of 2T user 1101 also at time, t1. Between time, t1, and time, t1+α, 3T user 1102 synchronizes its timing to the timing of 2T user 1101 and detects transmissions during its next CCA check. Accordingly, beginning at time, t1+α, 3T user 1102 is also denied transmission access to shared SAS spectrum 1100.

2T user 1101 occupies and transmits signals and data onto shared SAS spectrum 1100 between time, t1, and time, t2. At time, t2, 2T user 1101 vacates shared ASA spectrum 1100. With the next CCA check at time, t2, 3T user 1102 detects a clear CCA and begins accessing shared SAS spectrum 1100 again at time, t2.

In the various aspects of the present disclosure when shared channels of the available SAS spectrum resources are occupied with 2T users, 3T users may align downlink system timing with the corresponding 2T users. Each such 3T user performs LBT protocol procedures, which allow for opportunistic usage by 3T users of the shared channels occupied by 2T users at very short timescales. For example, a 2T user may occupy the shared channel for 300 s, vacate the shared channel for 10 s, and then again occupy the shared channel for another 300 s. The 3T users can then use the shared channel for the 10 s interval between the 2T user's use of the channel.

It should be noted that, in channels without 2T users, 3T users may, in principle, transmit using any technology, including WiFi. However WiFi cannot preserve 2T quality of service in a co-channel deployment. Therefore, 3T users would need to either switch from WiFi to transmissions using LTE/LTE-A with any combination of licensed and unlicensed spectrum when 2T users enter a channel or vacate the channel altogether.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) and any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication within a three tier system that includes a first spectrum tier specified for incumbent systems or users, a second spectrum tier specified for priority access systems, and a third spectrum tier specified for unlicensed systems or users, comprising:
   receiving, at a second tier transmitter, an indication of available shared spectrum resources, wherein the available shared spectrum resources includes one or more shared channels;
   determining, at the second tier transmitter, data for transmission over at least a portion of the one or more shared channels, including at least one unlicensed channel;
   transmitting, by the second tier transmitter, a channel reserving signal over the one or more shared channels during a clear channel assessment (CCA) period associated with the one or more shared channels and employed by a third tier transmitter to comply with a listen before talk (LBT) procedure, wherein a CCA period of a third tier user of the third tier transmitter and a second tier user of the second tier transmitter overlap due to a synchronization of timing between the third tier user of the third tier transmitter and the second tier user of the second tier transmitter; and
   transmitting, by the second tier transmitter, the data for transmission over the at least one unlicensed channel.

2. The method of claim 1, further including:
   ignoring, by the second tier transmitter, all LBT procedures associated with the one or more shared channels.

3. The method of claim 1, wherein the second tier transmitter is licensed to access the available shared spectrum resources when not used by a first tier user.

4. The method of claim 1, wherein the indication is received at the second tier transmitter from a first spectrum tier.

5. The method of claim 1, wherein the channel reserving signal is a channel usage beacon signal (CUBS).

6. A method of wireless communication within a three tier system that includes a first spectrum tier specified for incumbent systems or users, a second spectrum tier specified for priority access systems, and a third spectrum tier specified for unlicensed systems or users, comprising:
  receiving, at a third tier transmitter, an indication of available shared spectrum resources, wherein the available shared spectrum resources includes one or more shared channels;
  monitoring, by the third tier transmitter, a plurality of channels of the available shared spectrum resources for presence of at least one second tier transmitter, wherein the third tier transmitter detects the presence of the at least one second tier transmitter based on receipt of at least one of synchronization signals or system information transmitted by the at least one second tier transmitter on the plurality of channels;
  synchronizing, by the third tier transmitter, a timing of the third tier transmitter to the second tier transmitter, the synchronization of timing between a third tier user of the third tier transmitter and a second tier user of the second tier transmitter to allow a clear channel assessment (CCA) period of the third and second tier users to overlap;
  performing, by the third tier transmitter, the CCA in compliance with a listen before talk (LBT) procedure on the one or more shared channels; and
  transmitting, by the third tier transmitter, data over at least a portion of the one or more shared channels, including at least one unlicensed channel, in response to detecting the CCA as clear.

7. The method of claim 6, further including:
in response to detection of the at least one second tier transmitter on less than all of the plurality of channels:
  selecting a channel of the plurality of channels on which presence of the at least one second tier transmitter is not detected, wherein the performing CCA and the transmitting data occurs on the selected channel.

8. The method of claim 6, wherein the monitoring is performed periodically by the third tier transmitter.

9. The method of claim 6, wherein the indication is received at the third tier transmitter from a first spectrum tier.

10. An apparatus configured for wireless communication within a three tier system that includes a first spectrum tier specified for incumbent systems or users, a second spectrum tier specified for priority access systems, and a third spectrum tier specified for unlicensed systems or users, the apparatus comprising:
  at least one processor; and
  a memory coupled to the at least one processor,
  wherein the at least one processor is configured:
    to receive, at a second tier transmitter, an indication of available shared spectrum resources, wherein the available shared spectrum resources includes one or more shared channels;
    to determine, at the second tier transmitter, data for transmission over at least a portion of the one or more shared channels, including at least one unlicensed channel;
    to transmit, by the second tier transmitter, a channel reserving signal over the one or more shared channels during a clear channel assessment (CCA) period associated with the one or more shared channels and employed by a third tier transmitter to comply with a listen before talk (LBT) procedure, wherein a CCA period of a third tier user of the third tier transmitter and a second tier user of the second tier transmitter overlap due to a synchronization of timing between the third tier user of the third tier transmitter and the second tier user of the second tier transmitter; and
    to transmit, by the second tier transmitter, the data for transmission over the at least one unlicensed channel.

11. The apparatus of claim 10, further including configuration of the at least one processor to ignore, by the second tier transmitter, all LBT procedures associated with the one or more shared channels.

12. The apparatus of claim 10, wherein the second tier transmitter is licensed to access the available shared spectrum resources when not used by a first tier user.

13. The apparatus of claim 10, wherein the indication is received at the second tier transmitter from a first spectrum tier.

14. An apparatus configured for wireless communication within a three tier system that includes a first spectrum tier specified for incumbent systems or users, a second spectrum tier specified for priority access systems, and a third spectrum tier specified for unlicensed systems or users, the apparatus comprising:
  at least one processor; and
  a memory coupled to the at least one processor,
  wherein the at least one processor is configured:
    to receive, at a third tier transmitter, an indication of available shared spectrum resources, wherein the available shared spectrum resources includes one or more shared channels;
    to monitor, by the third tier transmitter, a plurality of channels of the available shared spectrum resources for presence of at least one second tier transmitter, wherein the third tier transmitter detects the presence of the at least one second tier transmitter based on receipt of at least one of synchronization signals or system information transmitted by the at least one second tier transmitter on the plurality of channels;
    to synchronize, by the third tier transmitter, a timing of the third tier transmitter to the second tier transmitter, the synchronization of timing between a third tier user of the third tier transmitter and a second tier user of the second tier transmitter to allow a clear channel assessment (CCA) period of the third and second tier users to overlap;
    to perform, by the third tier transmitter, the CCA in compliance with a listen before talk (LBT) procedure on the one or more shared channels; and
    to transmit, by the third tier transmitter, over at least a portion of the one or more shared channels, including at least one unlicensed channel, in response to detecting the CCA as clear.

15. The apparatus of claim 14, further including configuration of the at least one processor, executable in response to detection of the at least one second tier transmitter on less than all of the plurality of channels, to select a channel of the plurality of channels on which presence of the at least one second tier transmitter is not detected, wherein the configuration of the at least one processor to perform CCA and the configuration of the at least one processor to transmit data are executed for the selected channel.

16. The apparatus of claim 14, wherein the configuration of the at least one processor to monitor is performed periodically by the third tier transmitter.

17. The apparatus of claim 14, wherein the indication is received at the third tier transmitter from a first spectrum tier.

\* \* \* \* \*